(12) United States Patent
Fout

(10) Patent No.: US 8,349,193 B2
(45) Date of Patent: Jan. 8, 2013

(54) SAND SCREW DRYER

(75) Inventor: Gary E. Fout, Cypress, TX (US)

(73) Assignee: M-I L.L.C., Houston, TX (US)

(*) Notice: Subject to any disclaimer, the term of this patent is extended or adjusted under 35 U.S.C. 154(b) by 327 days.

(21) Appl. No.: 12/683,786

(22) Filed: Jan. 7, 2010

(65) Prior Publication Data
US 2010/0170859 A1 Jul. 8, 2010

Related U.S. Application Data

(60) Provisional application No. 61/143,082, filed on Jan. 7, 2009.

(51) Int. Cl.
B01D 21/06 (2006.01)
B01D 33/06 (2006.01)
B03B 5/52 (2006.01)

(52) U.S. Cl. ......... 210/803; 210/523; 209/464; 100/117

(58) Field of Classification Search .................. 210/523, 210/803; 209/464; 100/117
See application file for complete search history.

(56) References Cited

U.S. PATENT DOCUMENTS

| 4,379,049 | A | 4/1983 | Bassett |
| 4,701,266 | A | 10/1987 | Janka et al. |
| 6,467,964 | B2 | 10/2002 | Smith et al. |
| 6,585,115 | B1 | 7/2003 | Reddoch et al. |
| 7,073,433 | B2 | 7/2006 | Burke et al. |
| 7,380,617 | B1 | 6/2008 | James |

FOREIGN PATENT DOCUMENTS

CA 2534746 A1 7/2007

OTHER PUBLICATIONS

First Examiners Report issued Sep. 27, 2011 in corresponding Canadian application No. 2,689,719 (3 pages).

Primary Examiner — David A Reifsnyder
(74) Attorney, Agent, or Firm — Osha • Liang LLP

(57) ABSTRACT

An apparatus and process for separating drilling fluid from drill cuttings are disclosed. The separations are performed in a drying auger unit, including: an inclined housing having side walls joined by a bottom and having an inlet end and an outlet end; at least one inlet for feeding a cuttings slurry to the inlet end; a helical auger located in the housing for transporting drill cuttings from the inlet end of the housing to the outlet end of the housing, and a drive for rotating the auger, an elevated pan disposed in and extending the length of the housing and having an arcuate cross section with a radius greater than a radius of the helical auger, wherein the pan is disposed proximate at least a lower quadrant of the helical auger; the housing further comprising a liquid recovery zone adjacent to the pan for transporting drilling fluids, separated from the drill cuttings during transport along the pan by the helical auger, to a liquid collection zone disposed adjacent to the inlet; an outlet for recovering drilling fluids from the liquid collection zone; and at least one fluid inlet nozzle for injecting a fluid into the liquid recovery zone to facilitate transport of any solids in the liquid recovery zone to the liquid collection zone; and at least one outlet for recovering drill cuttings having a reduced content of drilling fluids.

20 Claims, 5 Drawing Sheets

SAND SCREW DRYER

CROSS-REFERENCE TO RELATED APPLICATIONS

This application, pursuant to 35 U.S.C. §119(e), claims priority to U.S. Provisional Application Ser. No. 61/143,082, filed Jan. 7, 2009. That application is incorporated by reference in its entirety.

BACKGROUND OF DISCLOSURE

1. Field of the Disclosure

Embodiments disclosed herein relate generally to separation of components of a cuttings slurry. In a more specific aspect, embodiments disclosed herein relate to an apparatus for the concurrent transport and separation of drill cuttings from a cuttings slurry. In yet further aspects, embodiments disclosed herein relate to a system and a process for handling, separating, and disposing of a cuttings slurry.

2. Background

Oilfield drilling fluid, also referred to as "drilling mud" or "returned drilling fluid," serves multiple purposes in the industry. Examples of drilling fluids can include, but are not limited to, water-based and/or oil-based fluids that are circulated downhole to provide hydrostatic pressure during drilling operations, as well as remove cuttings during a drilling operation, cool and lubricate a drill bit. Typically, the fluid is mixed at the surface and pumped downhole at high pressure to the drill bit through a bore of the drillstring. Once the fluid reaches the drill bit, it exits through various nozzles and ports where it lubricates and cools the drill bit.

Drilling fluid provides a column of hydrostatic pressure, or head, to prevent "blow out" of the well being drilled. This hydrostatic pressure offsets formation pressures thereby preventing fluids from blowing out if pressurized deposits in the formation are breeched. Two factors contributing to the hydrostatic pressure of the drilling mud column are the height (or depth) of the column (i.e., the vertical distance from the surface to the bottom of the wellbore) itself and the density (or its inverse, specific gravity) of the fluid used. Depending on the type and construction of the formation to be drilled, various weighting and lubrication agents are mixed into the drilling mud to obtain the right mixture. Typically, drilling fluid weight is reported in "pounds," short for pounds per gallon. Generally, increasing the amount of weighting agent solute dissolved in the mud base will create a heavier fluid. Drilling fluid that is too light may not protect the formation from blow outs, and drilling fluid that is too heavy may over invade the formation. Therefore, much time and consideration is spent to ensure the mud mixture is optimal. Because the mud evaluation and mixture process is time consuming and expensive, drillers and service companies prefer to reclaim the returned drilling fluid and recycle it for continued use.

Another significant purpose of the drilling mud is to carry the cuttings away from the drill bit at the bottom of the borehole to the surface. As a drill bit pulverizes or scrapes the rock formation at the bottom of the borehole, small pieces of solid material are left behind. The drilling fluid exiting the nozzles at the bit acts to stir-up and carry the solid particles of rock and formation to the surface within the annulus between the drillstring and the borehole. Therefore, the fluid exiting the borehole from the annulus is a slurry of formation cuttings in drilling fluid.

The exiting drilling fluids used in drilling operations return from downhole as a cuttings slurry, which typically will include both drilling fluid and drill cuttings. The composition of the cuttings slurry may also include other materials, such as weighting additives and agents, other suspended particulate matter, as well as other fluids. Before the fluid can be recycled and re-pumped down through nozzles of the drill bit, the drill cutting must be separated.

After various separatory operations, the cuttings slurry can have a general liquid phase or a substantially solids phase further having "dry" or "wet" solids. Those of ordinary skill in the art will appreciate that "dry" or "wet" refers generally to the amount of drilling fluids remaining with the substantially solids phase during and/or after any separatory operation. Thus, the solids phase may be considered "wet" if a substantial quantity of fluid phase is still present after the separatory operation. Likewise, the solids phase may be considered "dry" if the cuttings do not contain a substantial quantity of fluid phase. Those of ordinary skill in the art will further appreciate that the amount of fluids remaining with either of the phases may vary according to the type of formation being drilled, the type of drilling fluids used in the drilling operation, and the type of separatory operation employed.

Separation operations such as a clarifier, a centrifuge, a screen, a mud cleaner, or a shaker, are well known in the art for removing drilling fluid from a cuttings slurry. However, these operations are not always capable of sufficient or adequate separation of drilling fluids from the cuttings slurry. For example, a cuttings slurry recovered from a shaker may have a reduced drilling fluids content as high as 50% by volume. The high volume of drilling fluid in a cuttings slurry is problematic because at the end-point in a process, this slurry is usually designated for disposal. The effect of losing drilling fluid through disposal is doubled because replacement drilling fluid is subsequently re-added as a make-up stream. Further, the added liquid weight remaining in the cuttings slurry creates a greater load requirement for transport and disposal operations.

Accordingly, there exists a need in the art for improved separation devices and/or processes for removing drilling fluid from drill cuttings.

SUMMARY OF THE DISCLOSURE

In one aspect, embodiments disclosed herein relate to an apparatus for separating drilling fluid from drill cuttings, the apparatus including:

a. an inclined housing having side walls joined by a bottom and having an inlet end and an outlet end;
b. at least one inlet for feeding a cuttings slurry comprising drill cuttings and drilling fluids to the inlet end;
c. a helical auger located in the housing for transporting drill cuttings from the inlet end of the housing to the outlet end of the housing, and a drive for rotating the auger,
d. an elevated pan disposed in and extending the length of the housing and having an arcuate cross section with a radius greater than a radius of the helical auger, wherein the pan is disposed proximate at least a lower quadrant of the helical auger;
e. the housing further comprising a liquid recovery zone adjacent to the pan for transporting drilling fluids, separated from the drill cuttings during transport along the pan by the helical auger, to a liquid collection zone disposed adjacent to the inlet;
f. an outlet for recovering drilling fluids from the liquid collection zone; and g. at least one fluid inlet nozzle for injecting a fluid into the liquid recovery zone to facilitate transport of any solids in the liquid recovery zone to the liquid collection zone; and h. at least one outlet for recovering drill cuttings having a reduced content of drilling fluids.

In another aspect, embodiments disclosed herein relate to a process for separating drilling fluid from drill cuttings, the process including: feeding a cuttings slurry comprising drill cuttings and drilling fluid to an inlet of a drying auger unit, wherein the drying auger unit including:

a. an inclined housing having side walls joined by a bottom and having an inlet end and an outlet end;

b. at least one inlet for feeding a cuttings slurry to the inlet end;

c. a helical auger located in the housing for transporting drill cuttings from the inlet end of the housing to the outlet end of the housing, and a drive for rotating the auger, d. an elevated pan disposed in and extending the length of the housing and having an arcuate cross section with a radius greater than a radius of the helical auger, wherein the pan is disposed proximate at least a lower quadrant of the helical auger;

e. the housing further comprising a liquid recovery zone adjacent to the pan for transporting drilling fluids, separated from the drill cuttings during transport along the pan by the helical auger, to a liquid collection zone disposed adjacent to the inlet;

f. an outlet for recovering drilling fluids from the liquid collection zone; and g. at least one fluid inlet nozzle for injecting a fluid into the liquid recovery zone to facilitate transport of any solids in the liquid recovery zone to the liquid collection zone; and h. at least one outlet for recovering drill cuttings having a reduced content of drilling fluids;

the process further including concurrently in the drying auger unit: conveying the cuttings slurry from the inlet end of the housing to the outlet end of the housing; and separating at least a portion of the drilling fluid from the drill cuttings to form a drilling fluid fraction and a drill cuttings fraction having a first reduced content of drilling fluid; recovering the drilling fluid fraction from the liquid collection zone; and recovering the drill cuttings fraction having a first reduced content of drilling fluids.

Other aspects and advantages of the invention will be apparent from the following description and the appended claims.

DETAILED DESCRIPTION

In one aspect, embodiments disclosed herein relate to separation of components of a cuttings slurry. In a more specific aspect, embodiments disclosed herein relate to an apparatus for the concurrent transport and separation of drill cuttings from a cuttings slurry. In yet further aspects, embodiments disclosed herein relate to a system and a process for handling, separating, and disposing of a cuttings slurry.

As mentioned previously, processes for recovering drilling fluid from a cuttings slurry, may include a clarifier, a centrifuge, a screen, a mud cleaner, or a shaker. However, these operations are not always capable of sufficient or adequate separation of drilling fluids from a cuttings slurry. For example, a cuttings slurry processed through a clarifier and a shaker may have a drilling fluids content of 50% or greater by volume. Such high volumes may be present due to the high surface area/low particle size of the drill cuttings. Use of multiple processes, such as centrifuges and/or multiple shakers may be costly or limited due to constraints on available space, such as on drilling rigs.

It has been found that a drying auger unit according to embodiments disclosed herein may be used to transport, as well as separate, cuttings slurries during transport between various separation devices and storage/disposal bins, enhancing the ability to recover more drilling fluid from a cuttings slurry. The cuttings recovered from the drying auger unit may have a reduced drilling fluid content.

For example, drying auger units according to embodiments disclosed herein may be used to transport drill cuttings from a shaker to a storage/disposal bin; in some embodiments. Separation of drilling fluid from the drill cuttings during transport from the shaker to the storage bin, for example, may result in a decrease in drilling fluids content from about 50% to less than about 35%, by volume. In some embodiments, the drilling fluid content may be reduced to 15-25%, by volume.

As another example, a drying auger unit according to embodiments disclosed herein may be used to transport a cuttings slurry from a clarifier to a shaker, where separation of a portion of the drilling fluid during transport may reduce the separation load of the shaker.

Figure 1:
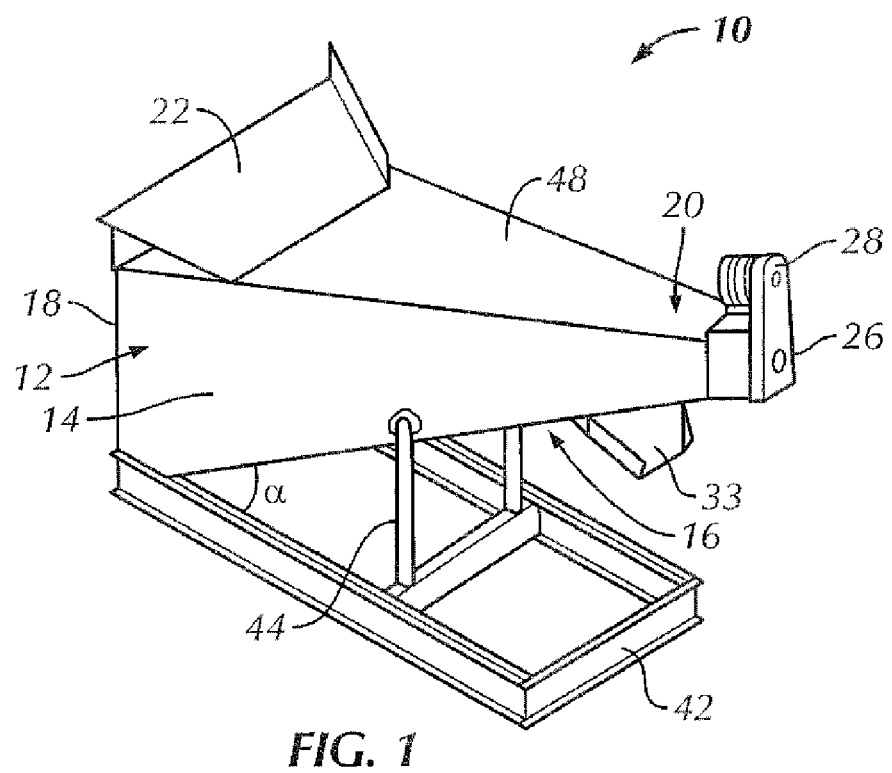
FIG. 1 is an external view of a drying auger unit according to embodiments disclosed herein.
Figure 2:
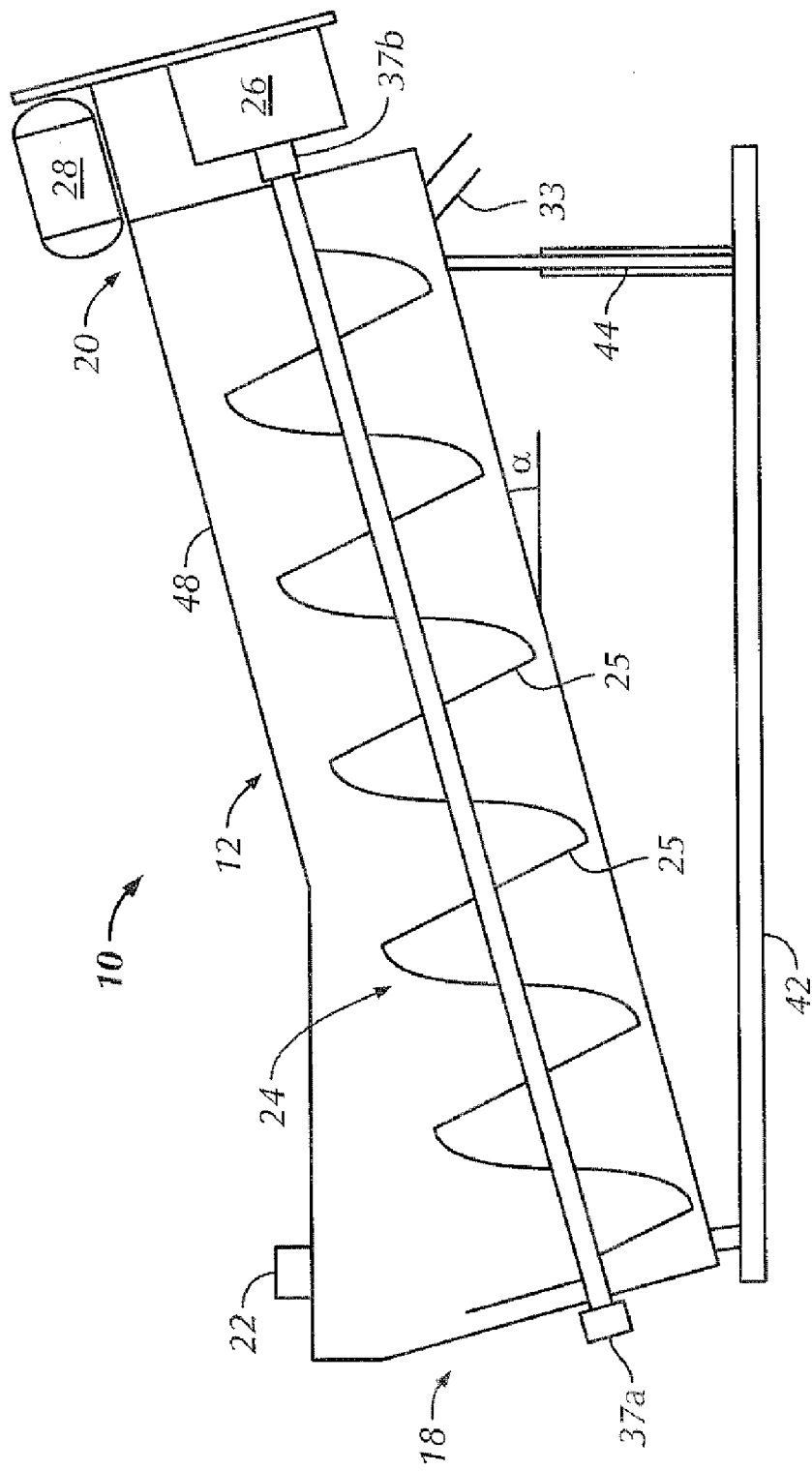
FIG. 2 is a longitudinal cross-sectional view of a drying auger unit according to embodiments disclosed herein.

Referring now to FIGS. 1 and 2, a drying auger unit according to embodiments disclosed herein is illustrated. The drying auger unit 10 may include an inclined housing 12 having side walls 14 joined by a bottom 16. Drying auger unit 10 may also include an inlet end 18 and an outlet end 20.

A cuttings slurry, including drill cuttings and drilling fluid may be fed to drying auger unit 10 via inlet 22. A helical auger 24, located at least partially within housing 12, may be used to transport the drill cuttings from inlet end 18 toward outlet end 20, where the helical auger, including multiple flights 25, may be rotated via a drive unit 26 (which may include motor 28). The drive unit, although illustrated as located proximate outlet end 20, may be located proximate inlet end 18 in some embodiments.

Figure 3:
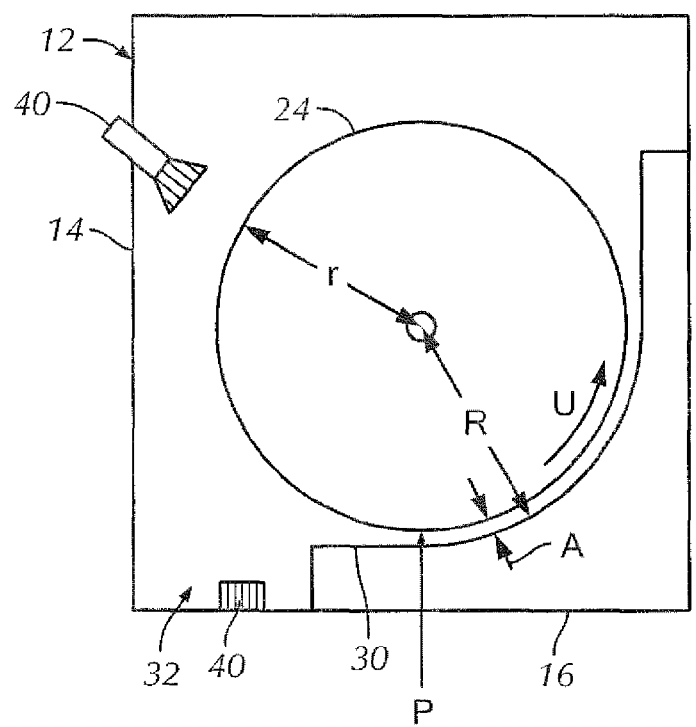
FIG. 3 is a lateral cross-sectional view of a drying auger unit according to embodiments disclosed herein.

Separation of drilling fluid from drill cuttings during transport is facilitated as shown in FIG. 3, which is a cross-sectional view of drying auger unit 10, such as taken from section 3-3 shown in FIG. 2. An elevated pan 30 is disposed in and extends along the length of housing 12. Elevated pan 30 may have an arcuate cross section with an effective radius R greater than a radius r of helical auger 24. For example, elevated pan 30 may have a general half-u shaped cross-section.

Elevated pan 30, for example, may be located proximate a lower quadrant of the helical auger 24, preferably along the lower quadrant proximate the upward rotation U of flights 25. In some embodiments, elevated pan 30 may extend at least 90°, such as from a lowermost portion P, in the direction of rotation of helical auger 24.

As the drill cuttings are transported via the rotation of helical auger 24 from inlet end 18 toward outlet end 20, the cuttings slurry gathers on elevated pan 30, due to the rotational forces and friction generated by rotation of flights 25, and is transported upward toward outlet end 20. Gravitational forces acting upon the cuttings slurry and/or compression of the drill cuttings along the length of the helical auger 24 separate at least a portion of the drilling fluid from the drill cuttings. The separated drilling fluid may then flow into liquid recovery zone 32, flowing downward along the length or a partial length of housing 12 for collection in a liquid collection zone (not shown) located adjacent to or proximate inlet 22. The liquid collection zone and inlet 22 should be sufficiently segregated so as to avoid mixing of the collected liquid, substantially free of drill cuttings, from the cuttings slurry feed during upset conditions, such as excessive cuttings slurry feed rates. Drill cuttings, having a decreased amount of drilling fluid, may then be recovered via outlet 33

As mentioned above, compression may be used in conjunction with gravity to separate the drilling fluid from the drill cuttings. For example, flights 25 of helical auger 24 may be evenly spaced in some embodiments, thus using primarily gravitational forces to separate the drilling fluid. In other embodiments, flights 25 may have a decreasing spacing along the length of elevated pan 30, thus compressing the cuttings slurry as it traverses from inlet end 18 toward outlet end 20, facilitating additional separation of drilling fluid from the cuttings slurry. Additionally, although only one helical auger is illustrated, two or more augers may be used.

As a result of possible abrasion or wear, it may be necessary to adjust the position of the helical auger 24. It may also be necessary to adjust the position (e.g., clearance A between helical auger 24 and elevated pan 30) based upon the type of formation being drilled and the size of the drill cuttings, among other factors. In some embodiments, the bearing and seal assemblies 37a, 37b can be adjustable so as to provide variable positioning of helical auger 24.

The motor 28 can be designed to run the helical auger 24 at a constant speed, or may be operated using a variable speed drive. The motor is typically operated at speeds necessary to provide both adequate transportation and the desired separation. In some embodiments, the helical auger is rotated at speeds sufficient to provide an axial velocity within a range of 5 to 25 feet per minute. In other embodiments, the helical auger is operated to provide an axial velocity from about 10 to about 15 feet per minute.

The cuttings slurry composition may include small particles, clays, large cuttings, etc., where some of the particles may either temporarily adhere to flights 25, or may otherwise find their way into liquid collection zone 32. As solids, such as clays or other components of a cuttings slurry may hinder flow of liquids within the liquid recovery zone or may decrease the efficiency of cuttings transport, one or more fluid inlet nozzles 40 may be provided for injection of a fluid, such as water or recovered drilling fluid, into the liquid recovery zone, thus facilitating transport of solids, although undesirable, to the liquid collection zone. A filter or screen (not shown), for example, may be provided at an inlet to the liquid collection zone to collect any such particles that may be carried over by the flights into the liquid recovery zone. Fluid inlet nozzles 40, venturri nozzles for example, may be located along one or more of the housing bottom, a side wall, or a housing top, where the liquid flow from the nozzles 40 is generally directed into the liquid collection zone. Nozzles 40 may also be oriented to clean flights 25 of helical auger 24, such as illustrated in FIG. 3. The injection of fluid via nozzles 40 may be performed as needed, intermittently, or continuously.

Referring again to FIG. 1, the drying auger unit can have a support means 42 for maintaining the dryer at an angle a from horizontal. The support means 42 can be any such support as is known in the art to support equipment, including a portable skid with support legs and/or wheels. In some embodiments, the support means 42 can further include a tilt angle mechanism 44 for adjusting the incline angle $\alpha$ of the dryer. Though the drying auger unit can be used in a nearly horizontal arrangement (i.e., ~0 degrees) due to elevated pan 30, the incline angle is typically $0<\alpha<90$ degrees. In some embodiments, the angle of elevation is in the range of 15 to 25 degrees from the horizontal. In other embodiments, the angle of elevation from horizontal ranges from about 5 to 35 degrees. The angle of elevation provides various benefits, such as facilitating drainage of fluids and fines to the liquid collection zone, and the range of elevation may be varied depending upon the type of formation being drilled and/or the amount of separation that is desired.

In some embodiments, housing 12 may include a top 48, for example, to shield separation operations from external environmental conditions, such as weather. Additionally, use of a top 48 may limit emissions from the process that may otherwise occur if the unit were open to the environment. In addition to limiting emissions, an enclosed housing 12 may also allow recovery of drilling fluid vapors via a vacuum system, which can then further increase the amount of fluid recovered from the slurry. Heating of the cuttings slurry, such as proximate outlet end 16, may also enhance separation of drilling fluid from the drill cuttings.

The drying auger unit as described above with respect to FIGS. 1-3 may be used in processes used for the recovery of drilling fluid from a cuttings slurry. As mentioned above, such processes may include clarifiers and shakers, among other apparatus. Drying auger units according to embodiments disclosed herein may be used to transport cuttings slurries between such units, between such units and drill cuttings disposal or collection bins, or may be used solely as a means to separate drilling fluid from a cuttings slurry.

Figure 4:
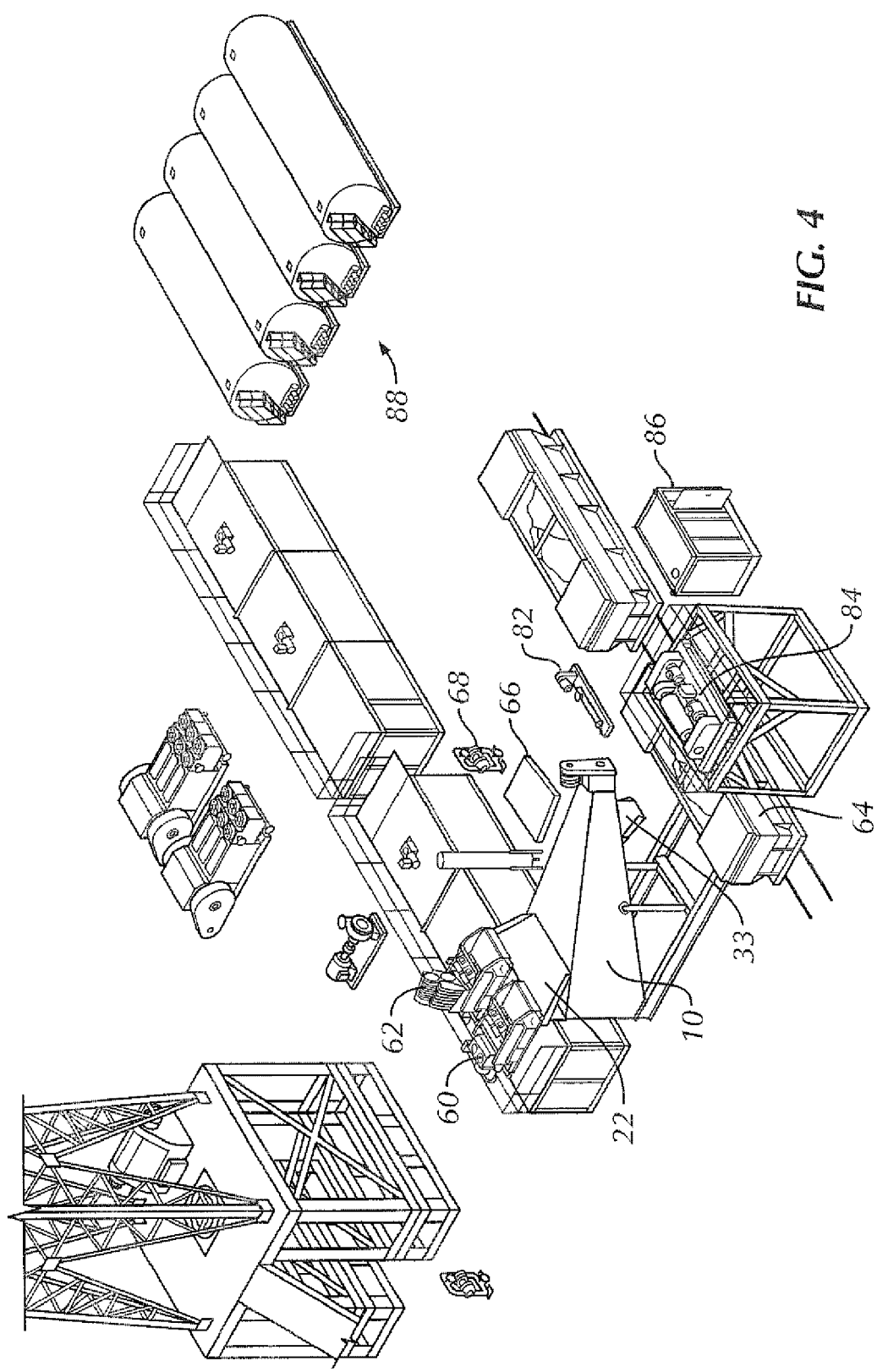
FIG. 4 is a schematic representation of a separatory system according to embodiments disclosed herein.

Referring now to FIG. 4, a process for the separation of drilling fluid from a cuttings slurry, using a drying auger unit according to embodiments disclosed herein, is illustrated. In this embodiment, a cuttings slurry may be fed, for example, from a water clarifier (not shown) or other upstream apparatus to shaker 60 or mud cleaner 62. Following partial separation of drilling fluid from drill cuttings, as mentioned above, the drill cuttings and other material recovered from shaker 60 or mud cleaner 62 may have a substantial amount of fluid associated with the particles, such as 50% or more by volume.

The cuttings slurry recovered from shaker 60 or mud cleaner 62 may be fed to inlet 22 of a drying auger unit 10 according to embodiments disclosed herein. Separations within drying auger unit 10 may be performed, as described above, recovering via outlet 33 a cuttings slurry having a reduced fluid content. The cuttings recovered via outlet 33 may then be dropped into a railcar hopper 64 for shipment to a disposal site, for example.

Drilling fluid separated from the drill cuttings within drying auger unit 10 may be collected in liquid collection zone 66, such as a sump. Sump pumps 68 or other appropriate devices may then be used to forward the recovered drilling fluid for further processing, for recycle and reuse within a mud system, or may be pumped through nozzles 40 (FIG. 3)

for use in operation and cleaning of drying auger unit 10. Alternatively, pump 82 may provide fresh water or alternative fluids to nozzles 40.

Other equipment that may be associated with the cuttings slurry separation may also include a centrifuge 84, a dewatering system 86, and reserve fluids tanks 88. Each of these may be appropriately connected at a desired point within the recovery and separation system via suitable flow conduits and transport devices (pumps, etc.) (not shown). However, depending on the type of contamination, no additional mechanical or chemical treatment may be required. As such, embodiments of the present disclosure may include the treatment of drill cuttings that either have or have not been mechanically or chemically treated.

Figure 5:
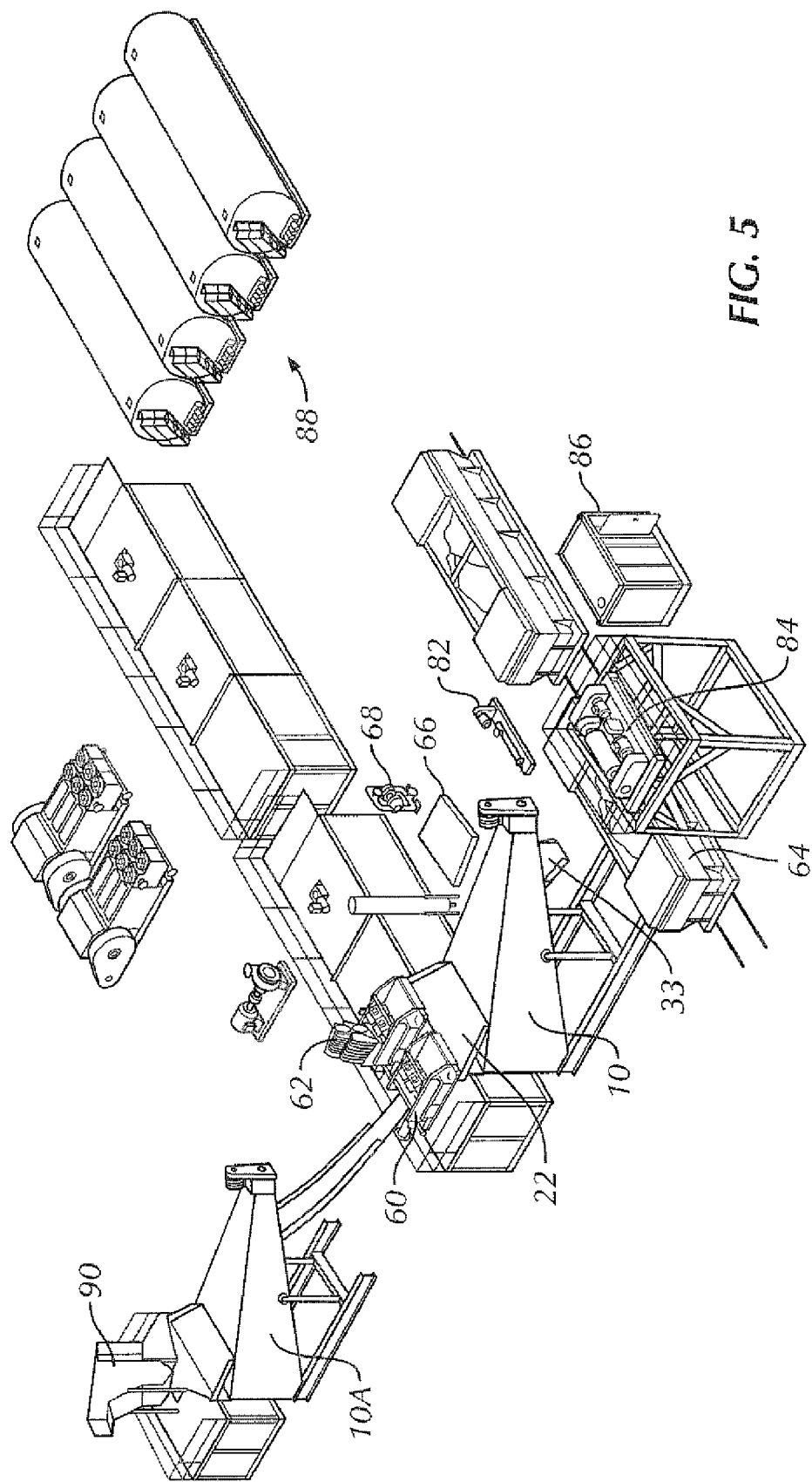
FIG. 5 is a schematic representation of a separatory system according to embodiments disclosed herein.

Referring now to FIG. 5, a process for the separation of drilling fluid from a cuttings slurry, using multiple drying auger units according to embodiments disclosed herein, is illustrated, where like numerals represent like parts. In this embodiment, a cuttings slurry may be fed, for example, from a water clarifier 90 or other upstream apparatus to a first drying auger unit 10A. The first drying auger unit 10A may perform an initial separation of the drilling fluid from the drill cuttings, partially reducing the drilling fluid content of the cuttings slurry. The partially separated cuttings slurry may then be fed from drying auger unit 10A to shaker 60 or mud cleaner 62, as described above. Thus, transport of the cuttings from clarifier 90 to shaker 60 may have the added benefit of at least partially separating the drilling fluid from the drill cuttings.

Advantageously, drying auger units according to embodiments disclosed herein beneficially reduce the amount of drilling fluid within a cuttings slurry. The apparatus may be appropriately sized according to specific needs and may be constructed of any suitable materials as would be apparent to a person of skill in the art. The drying auger unit is advantageous over the prior art for various reasons. For example, the drying auger unit can be used with slurries from different kinds of formations, such as sand and large shale formations. Alternately, the drying auger unit can also be used with fine silts or clay bearing formations. The drying auger unit also is usable with large, bulky cuttings or with smaller fines on the micron scale. The dryer is also beneficial over the prior art because it provides concurrent transportation and separation of the cuttings slurry.

Also advantageously, the drying auger unit may help reduce the amount of drilling fluid lost to disposal, which simultaneously means less make-up fluids are needed since the separated and recovered drilling fluid can be cleaned (such as by washing) and recirculated to a drilling fluid storage tank for eventual reuse in the drilling operation. Other embodiments disclosed herein provide for methods of treating and disposing drill cuttings. After proper treatment, drill cuttings may be mixed with readily available filler, such as top soil, and reused in construction operations. By using the cuttings in construction operations, the cuttings do not have to be buried in the ground, which may have environmental impacts, such as the formation for sink areas in certain locations. Furthermore, using the drill cuttings in construction operations may decrease the cost of disposal because the construction material may be sold for a profit, thereby offsetting operation expenses.

Further, use of a clarifier (or equivalent) to feed an upstream drying auger unit provides the advantage of initially separating some of the drilling fluid from the cuttings slurry. The pre-removal of drilling fluids reduces the load off the next drying auger unit and other further downstream units, which advantageously reduces wear and tear and conserves energy.

While the present disclosure has been described with respect to a limited number of embodiments, those skilled in the art, having benefit of the present disclosure will appreciate that other embodiments may be devised which do not depart from the scope of the disclosure described herein. Accordingly, the scope of the disclosure should be limited only by the claims appended hereto.

What is claimed is:

1. An apparatus for separating drilling fluid from drill cuttings, the apparatus comprising:
 a) an inclined housing having side walls joined by a bottom and having an inlet end and an outlet end;
 b) at least one inlet for feeding a cuttings slurry comprising drill cuttings and drilling fluids to the inlet end;
 c) a helical auger located in the housing for transporting drill cuttings from the inlet end of the housing to the outlet end of the housing, and a drive for rotating the auger,
 d) an elevated pan disposed in and extending the length of the housing and having an arcuate cross section with a radius greater than a radius of the helical auger, wherein the pan is disposed proximate at least a lower quadrant of the helical auger;
 e) the housing further comprising a liquid recovery zone adjacent to the pan for transporting drilling fluids, separated from the drill cuttings during transport along the pan by the helical auger, to a liquid collection zone disposed adjacent to the inlet;
 f) an outlet for recovering drilling fluids from the liquid collection zone; and
 g) at least one fluid inlet nozzle for injecting a fluid into the liquid recovery zone to facilitate transport of any solids in the liquid recovery zone to the liquid collection zone; and
 h) at least one outlet for recovering drill cuttings having a reduced content of drilling fluids.

2. The apparatus of claim 1, wherein the elevated pan has a general half-u shaped cross-section.

3. The apparatus of claim 2, wherein the cross section of the half-u shaped pan extends at least 90° from approximately a lowermost path of the helical auger.

4. The apparatus of claim 1, wherein the at least one fluid inlet port for injecting a fluid is a venturri nozzle.

5. The apparatus of claim 1, wherein the drive rotates the auger at a speed to convey the drill cuttings at an axial velocity in the range from about 5 to about 25 feet per minute.

6. The apparatus of claim 1, wherein the inclined housing is inclined at an angle in the range from about 1 degree to about 45 degrees.

7. The apparatus of claim 1, wherein the inclined housing is inclined at an angle in the range from about 10 degree to about 20 degrees.

8. The apparatus of claim 1, wherein the drive is a variable speed drive.

9. A process for separating drilling fluid from drill cuttings, the process comprising:
 feeding a cuttings slurry comprising drill cuttings and drilling fluid to an inlet of a drying auger unit, wherein the drying auger unit comprises:
 a) an inclined housing having side walls joined by a bottom and having an inlet end and an outlet end;
 b) at least one inlet for feeding a cuttings slurry to the inlet end;
 c) a helical auger located in the housing for transporting drill cuttings from the inlet end of the housing to the outlet end of the housing, and a drive for rotating the auger, d) an elevated pan disposed in and extending the length of the housing and having an arcuate cross section with a radius greater than a radius of the helical auger, wherein the pan is disposed proximate at least a lower quadrant of the helical auger;

e) the housing further comprising a liquid recovery zone adjacent to the pan for transporting drilling fluids, separated from the drill cuttings during transport along the pan by the helical auger, to a liquid collection zone disposed adjacent to the inlet;

f) an outlet for recovering drilling fluids from the liquid collection zone; and g) at least one fluid inlet nozzle for injecting a fluid into the liquid recovery zone to facilitate transport of any solids in the liquid recovery zone to the liquid collection zone; and h) at least one outlet for recovering drill cuttings having a reduced content of drilling fluids;

concurrently in the drying auger unit:
   conveying the cuttings slurry from the inlet end of the housing to the outlet end of the housing; and
   separating at least a portion of the drilling fluid from the drill cuttings to form a drilling fluid fraction and a drill cuttings fraction having a first reduced content of drilling fluid;
recovering the drilling fluid fraction from the liquid collection zone; and
recovering the drill cuttings fraction having a first reduced content of drilling fluids.

10. The process of claim 9, further comprising injecting a wash fluid through the at least one fluid inlet nozzle.

11. The process of claim 10, wherein the wash fluid comprises at least one of recovered drilling fluid and water.

12. The process of claim 9, further comprising:
recovering a fluid comprising drill cuttings and drilling fluid from a wellbore;
separating at least a portion of the drilling fluid from the drill cuttings in a clarifier to form a liquid fraction and a cuttings fraction;
feeding the cuttings fraction from the clarifier to a shaker;
separating drilling fluid from drill cuttings in the shaker to form a fluid fraction and the cuttings slurry;
feeding the cuttings slurry recovered from the shaker to the drying auger unit.

13. The process of claim 9, further comprising:
recovering a fluid comprising drill cuttings and drilling fluid from a wellbore;
separating at least a portion of the drilling fluid from the drill cuttings in a clarifier to form a liquid fraction and the cuttings slurry.

14. The process of claim 13, further comprising:
feeding the cuttings slurry having a first reduced content of drilling fluid to a shaker; and
separating additional drilling fluid from the cuttings slurry to produce a drill cuttings fraction having a second reduced drilling fluid content.

15. The process of claim 14, further comprising:
feeding the drill cuttings fraction having a second reduced drilling fluid content to a second drying auger unit, the second drying auger unit comprising:
   a) an inclined housing having side walls joined by a bottom and having an inlet end and an outlet end;
   b) at least one inlet for feeding a cuttings slurry to the inlet end;
   c) a helical auger located in the housing for transporting drill cuttings from the inlet end of the housing to the outlet end of the housing, and a drive for rotating the auger,
   d) an elevated pan disposed in and extending the length of the housing and having an arcuate cross section with a radius greater than a radius of the helical auger, wherein the pan is disposed proximate at least a lower quadrant of the helical auger;
   e) the housing further comprising a liquid recovery zone adjacent to the pan for transporting drilling fluids, separated from the drill cuttings during transport along the pan by the helical auger, to a liquid collection zone disposed adjacent to the inlet;
   f) an outlet for recovering drilling fluids from the liquid collection zone; and
   g) at least one fluid inlet nozzle for injecting a fluid into the liquid recovery zone to facilitate transport of any solids in the liquid recovery zone to the liquid collection zone; and
   h) at least one outlet for recovering drill cuttings having a reduced content of drilling fluids;
concurrently in the second drying auger unit:
   conveying the drill cuttings fraction from the inlet end of the housing to the outlet end of the housing; and
   separating at least a portion of the drilling fluid from the drill cuttings to form a second drilling fluid fraction and a drill cuttings fraction having a third reduced content of drilling fluid;
recovering the second drilling fluid fraction from the liquid collection zone; and
recovering the drill cuttings fraction having a third reduced content of drilling fluids.

16. The process of claim 9, wherein the cuttings slurry comprises at least 40 percent drilling fluid by volume.

17. The process of claim 16, wherein the drill cuttings fraction having a first reduced content of drilling fluids comprises less than 35 percent drilling fluid by volume.

18. The process of claim 16, wherein the drill cuttings fraction having a first reduced content of drilling fluids comprises from about 15 to about 25 percent drilling fluid by volume.

19. The process of claim 9, wherein the drive is a variable speed drive, the process further comprising:
determining a drilling fluid content of the recovered drill cuttings fraction; and
adjusting a speed of the drive in response to the determined drilling fluid content.

20. The process of claim 9, further comprising recycling at least a portion of the drilling fluid fraction to a drilling mud system.

* * * * *